United States Patent
Ouzieli et al.

(10) Patent No.: US 10,278,056 B2
(45) Date of Patent: Apr. 30, 2019

(54) WIRELESS COMMUNICATION NETWORKS WITH PROBE RESPONSE

(71) Applicant: INTEL IP CORPORATION, Santa Clara, CA (US)

(72) Inventors: Ido Ouzieli, Tel Aviv (IL); Liat Kahana, Bat Hefer (IL); Necati Canpolat, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/605,024

(22) Filed: May 25, 2017

(65) Prior Publication Data

US 2018/0343554 A1 Nov. 29, 2018

(51) Int. Cl.
| | | |
|---|---|---|
| *H04W 8/00* | (2009.01) | |
| *H04W 76/10* | (2018.01) | |
| *H04W 88/08* | (2009.01) | |
| *H04W 84/12* | (2009.01) | |

(52) U.S. Cl.
CPC ........... *H04W 8/005* (2013.01); *H04W 76/10* (2018.02); *H04W 84/12* (2013.01); *H04W 88/08* (2013.01)

(58) Field of Classification Search
CPC ..... H04W 8/005; H04W 48/12; H04W 48/16; H04W 72/04; H04W 72/042; H04W 72/044; H04W 72/12; H04W 72/1284; H04W 76/10; H04W 84/12; H04W 88/08; H04W 8/00; H04W 76/02
See application file for complete search history.

(56) References Cited

U.S. PATENT DOCUMENTS

| | | | | |
|---|---|---|---|---|
| 9,001,806 | B2 * | 4/2015 | Segev | H04W 72/044 370/338 |
| 9,185,725 | B2 * | 11/2015 | Kneckt | H04W 74/002 |
| 9,807,813 | B2 * | 10/2017 | Hart | H04W 76/18 |
| 9,907,042 | B2 * | 2/2018 | Segev | H04W 56/0045 |
| 9,999,010 | B2 * | 6/2018 | Segev | H04W 56/001 |
| 2013/0155933 | A1 * | 6/2013 | Kneckt | H04W 74/002 370/312 |
| 2013/0188628 | A1 * | 7/2013 | Lee | H04W 48/14 370/338 |
| 2015/0156709 | A1 * | 6/2015 | Shukla | H04W 48/16 370/338 |
| 2015/0223154 | A1 * | 8/2015 | Jeong | H04W 48/16 370/338 |
| 2015/0264710 | A1 * | 9/2015 | Kneckt | H04W 72/0446 370/336 |
| 2016/0014809 | A1 * | 1/2016 | Kneckt | H04W 74/002 370/312 |
| 2016/0127988 | A1 * | 5/2016 | Yao | H04W 48/18 370/338 |
| 2016/0309537 | A1 * | 10/2016 | Hart | H04W 76/027 |
| 2017/0171833 | A1 * | 6/2017 | Vamaraju | H04W 60/04 |

* cited by examiner

*Primary Examiner* — Tri H Phan
(74) *Attorney, Agent, or Firm* — International IP Law Group, P.L.L.C.

(57) ABSTRACT

In one example, a method for providing probe responses in a wireless communication network includes determining, in response to a broadcast probe request from a station, to respond to the broadcast probe request based on whether the station previously acknowledges a previous broadcast probe response from an access point. Additionally, the method includes transmitting a probe response to the station based on the determination.

19 Claims, 6 Drawing Sheets

WIRELESS COMMUNICATION NETWORKS WITH PROBE RESPONSE

TECHNICAL FIELD

This disclosure relates generally to techniques for operating a wireless network. More specifically, the disclosure describes techniques for probe response in a wireless network.

BACKGROUND

Wireless communication, also referred to as WiFi, is a technology that provides various types of wireless devices (stations) with Internet access. WiFi operates according to a standard known as Institute of Electrical and Electronics Engineers (IEEE) 802.11. Stations communicate with access points (APs) using the IEEE 802.11 protocol to access networks such as the Internet. In order to establish the wireless network connection, the IEEE 802.11 standard specifies a protocol in which stations and access points initiation their individual wireless network connections.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Because there may be multiple access points providing connections to multiple networks within a wireless station's communication range, the station may poll an area to determine what access points are available. The station's communication range represents how far the station is capable of transmitting wireless signals. This polling is referred to as a probe response because the station probes, and the access points within communication range, respond. While the station may transmit the probe request to a specific access point, the probe request is typically broadcast. Broadcasting the probe request means that all access points that receive the probe request may respond. Each of the responses received by the requesting station indicates an access point that is available for network connection.

Because there may be a large number of available APs responding to the probe request, it is possible that some of the access points cannot complete the probe response successfully. For example, some responses may time out, leaving such access points undiscovered by the requesting station. Based on the IEEE 802.11 standard, stations and access points may only transmit when no energy is detected on a network channel. In this way, the network operates to prevent multiple stations from transmitting concurrently. While this promotes clear communication, the protocol imposes a large time requirement for a large number of access points trying to transmit probe responses. Therefore, stations typically broadcast more than one probe request for the purpose of discovering additional APs. However, this is a random process, and as all the APs once again try to respond to the additional probe requests, the APs that were not discovered in the previous cycle may be missed once again. It is noted that in addition to not discovering APs, this probe response process may also cause the thrashing of the wireless network due to the increasing population of duplicated probe responses.

In an example location with six access points within the communication range of a station, the probe response protocol includes one probe request, six probe responses, and six ACKs. However, when the station transmits an additional broadcast probe request to discover undiscovered access points (those that failed to receive the probe request, or attempted to respond but failed), once again all the access points within communication range answer, so the same set of management frames is repeated. The management frames are the wireless transmissions that discover, create, and maintain network connections. If four of the six example access points are discovered in a first probe response cycle, and the remaining two are discovered in a second broadcast cycle, there are eight redundant transmissions: the four probe responses and four ACks from the access points discovered in both cycles.

While there may be only one station in the example location, there may typically be eight stations. During a rush of foot traffic by station users, there may be a couple dozen stations. There may also be more in high station density locations. If the example location of six access points is in a high-density location, there may be four dozen wireless stations. In such a high-density location, each access point may broadcast probe requests at five minute intervals, resulting in eight redundant management frames per station, each probe response broadcast cycle. There are thus three hundred eighty-four redundant management frames every five minutes.

As the prevalence of Wi-Fi networks increases, wireless communication performance in multiple-access-point locations may decrease due to the large amount of probe response traffic occupying the wireless communication medium. The same wireless medium used to transmit the probe requests and responses is used to transmit the actual data being requested. Thus, as more communication slots are taken up by the probe response transmissions, fewer slots are available to transmit the actual data being requested by users over the wireless network. In crowded locations, such as corporates, stadiums, subways, and airports, even the performance of already-connected stations may suffer as the transmission medium becomes increasingly populated with probe response transmissions. This results in poor performance for the network, and a poor Quality of Experience for the user.

Accordingly, in some embodiments, access points use a probe response protocol where the repetitive responses may be reduced. The repetitive responses are reduced because such access points do not respond to probing from stations that share a recent probe-response history with the access point. Specifically, if the probe-response history indicates the same station recently polled the access point, and may already be aware of the access point's availability, the access point does not respond to the current probe request from the station.

Figure 1:
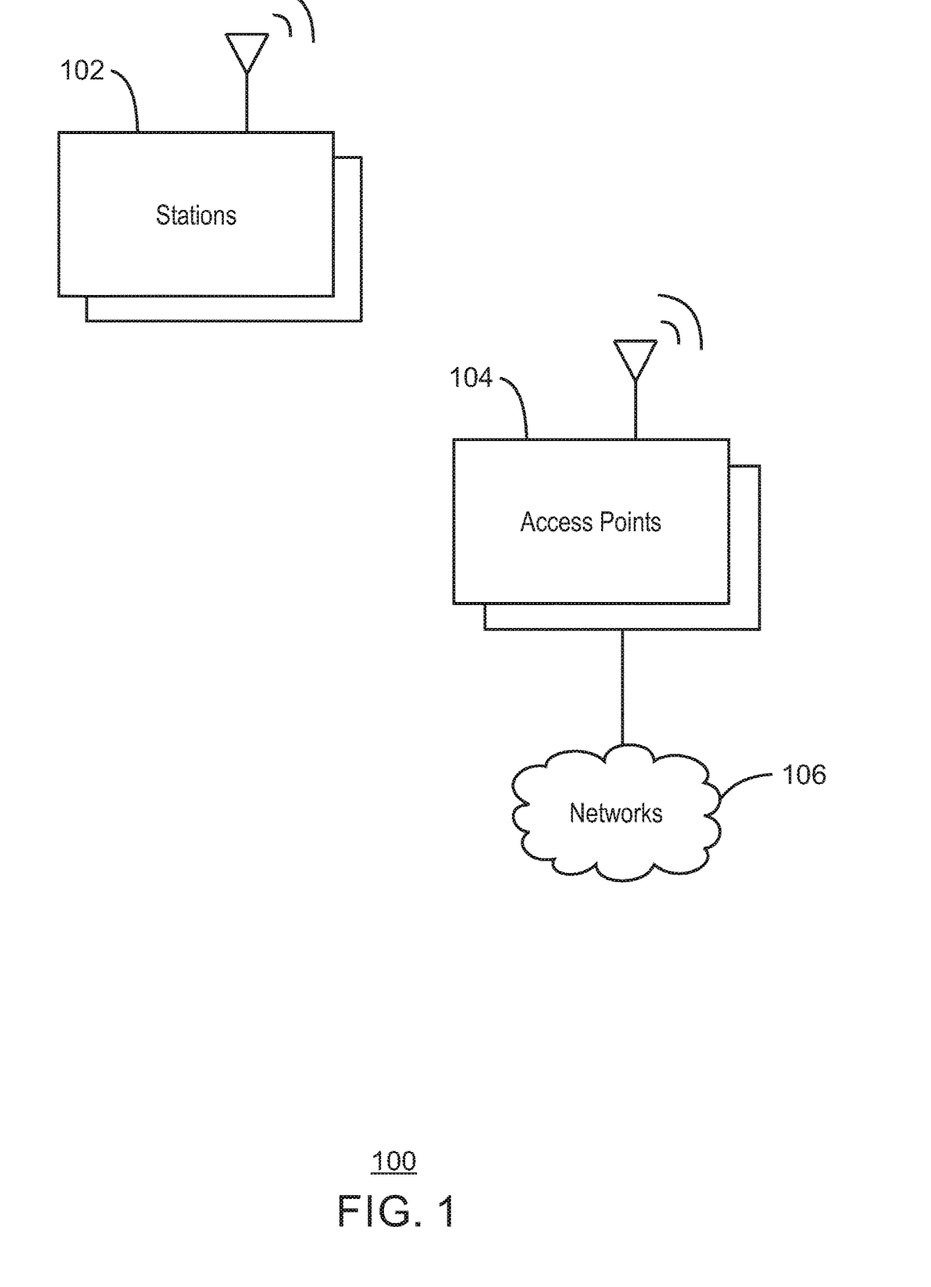
FIG. 1 is a block diagram of a wireless communication network with probe response.

FIG. 1 is a block diagram of a wireless communication network 100 with probe response. The network 100 includes wireless stations 102, access points 104, and associated networks 106. The stations 102 may include any wireless computing device, such as a smartphone, tablet, laptop, Internet of Things (IoT) devices, wearable computing devices, and the like. The APs 104 may include devices, such as wireless routers, which provide wireless communication connectivity to associated networks 106. The associated networks 106 may be a network associated with the access point 104, such as local area networks (LANs), wide area networks (WANs), and the Internet.

During probe response, the stations 102 scan the available channels within a specific radio band to identify the access points 104 that are available within the station's communication range. Scanning the available channels means the stations 102 broadcast a probe request to all access points 104 operating in the same radio band. In response to receiving the probe request, the access points 104 may check their probe-response history to determine whether to respond to the probe request. The probe-response history may be a log that documents the stations 102 to which the access point 104 has transmitted a probe response, and when. By consulting the probe-response histories, it is possible to determine if the access point 104 has successfully transmitted a probe response to the requesting station 102 within a specific threshold of time. The specified threshold of time is an amount of time within which the probe response may be determined to have been transmitted recently. Thus, if there is no recent history for the requesting station, the requesting station may not be aware of the availability of the access point. Thus, the access point 104 may generate and transmit a probe response to the requesting station 102. However, if, according to the probe-response history, the access point 104 has successfully transmitted a probe response within the threshold period, the access point 104 may not respond to the probe request.

In addition to saving the transmission of the probe response, the decision not to transmit the probe request prevents the transmission of one additional transmission from the station to the responding access point. The requesting station 102, when receiving the probe response, is thereby able to identify the responding access point 104 as available for wireless network connectivity. Accordingly, the station 102 sends an acknowledgement (ACK) to the responding access point 104. The ACK indicates to the AP that the Probe response was received by the station. The ACK is transmitted immediately following the reception, so the timestamp also indicates the time that the station 102 received the probe response. In some embodiments, when the ACK is received, the access point 104 logs the ACK in its probe-response history by documenting the station 102 sending the ACK, and the timestamp of the ACK. The timestamp represents the day and time when the access point 104 receives the ACK. Knowing that an access point 104 has sent the probe does not mean the probe response was acknowledged. Thus, for differing future probe responses. The access point 102 uses the ACK to determine that the probe response was received correctly, and an additional response would be redundant. Thus, in cases where the access point 104 does not send a probe response, the station 102 does not transmit the ACK, thus saving another communication slot. In some embodiments, the station 102 may be identified in the probe-response history by media access control (MAC) address. The MAC address uniquely identifies the station 102 for data communications once the station 102 and an AP 104 establish a network connection.

Because situations may arise, as described above, that prevent available access points 104 from responding to probe requests, the requesting station 102 may broadcast an additional probe request to identify other access points 104 within the station's communication range. For access points 104 that have already responded to the previous probe request, no response is sent, as described above. Thus, more communication slots are available for the access points 104 that were not able to successfully respond to the previous probe request. In this way, such access points may transmit probe responses to a subsequent probe request.

It is noted that, in some scenarios, stations 102 may scan an area for access points 104 in order to help identify geographic location, and not necessarily to access the associated networks 106 of the access points 104. It is possible to determine the geographic location of a station 102 by analyzing data that is typically included in probe responses. Thus, in order to determine location in this way, the station 102 does not specify the threshold time value in the probe request. In such a case, all access points 104 may repeatedly answer the probe request with a probe response, thereby enabling the station 102 to determine its geographic location.

Figure 2:
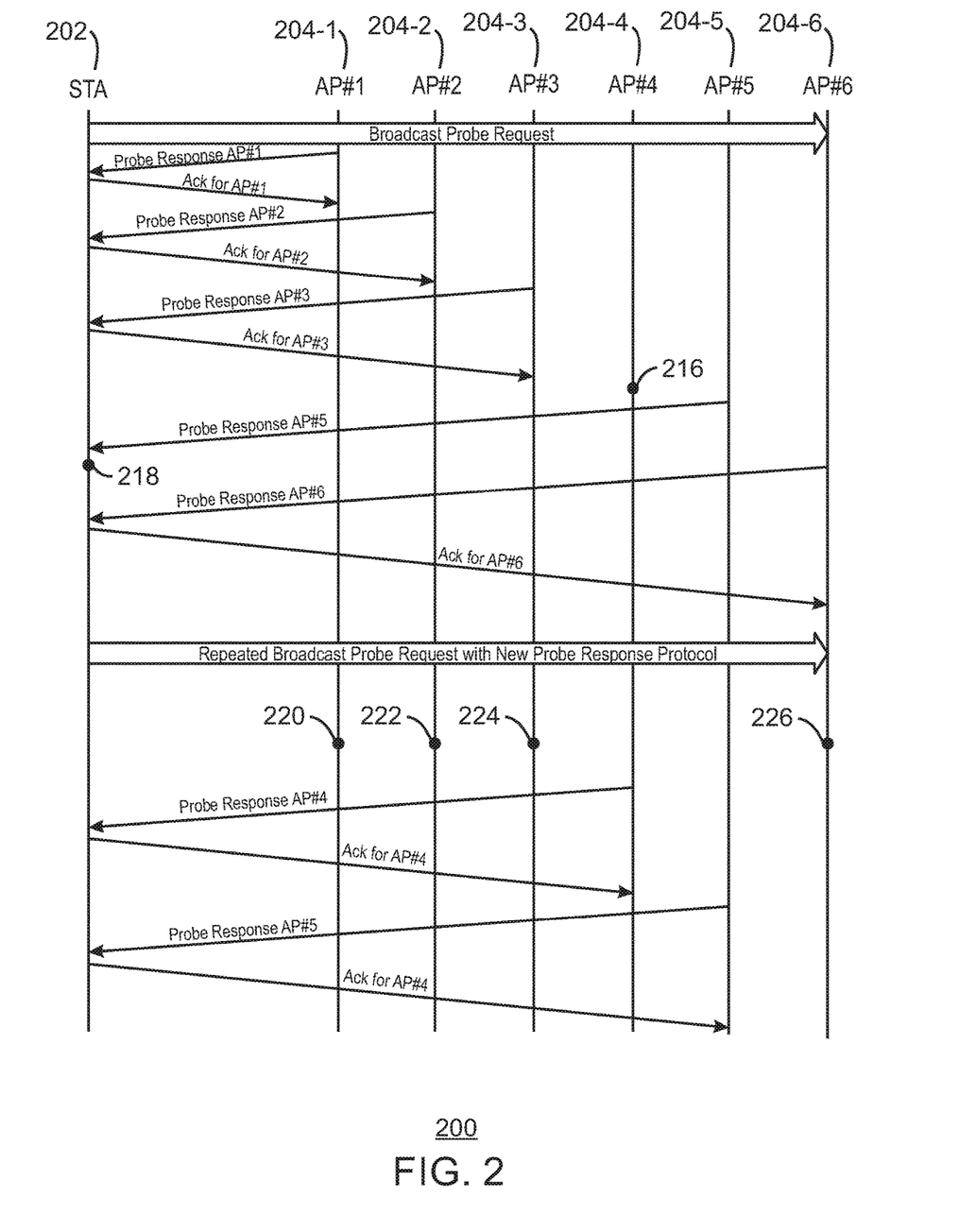
FIG. 2 is a method for a wireless communication network with probe response.

FIG. 2 is a message flow diagram 200 between a station 202 and access points 204-1 to 204-6 in a wireless communication network with probe response. The access points 204-1 to 204-6 represent a set of access points within the communication range of the station 202. A message flow diagram represents the communications that are broadcast, transmitted over a wireless communication medium. Each arrow on the message flow diagram 200 represents one message, with the arrow indicating from left to right, the sender and the receiver, respectively.

The first message of the message flow diagram 200 is at the top, and is a probe request that is broadcast by the access point 202 to access points 204-1 through 204-6. The next message in the message flow is a probe response from access point 204-1 to the station 202. Subsequently, the station 202 sends an ACK to the access point 204-1. The probe responses and ACKs follow for each of the access points 204-2, 204-3. Although not shown here, upon receiving the ACK from the station, each of the access points 204-1 to 204-3 logs the receipt of the message, and the timestamp of the receipt, in the access points' probe response histories. This logging cannot be represented as a message, and thus is not represented in the message flow diagram 200.

With regard to access point 204-4, event 216 represents a scenario where the access point 204-4 missed the probe request. It is possible that interference on the radio band prevented the access point 204-4 from clearly receiving the probe request. Accordingly, the access point 204-4 does not send a probe response.

In contrast, access point 204-5 does send a probe response to the station 202. However, event 218 represents a scenario where the station 202 does not transmit an ACK back to the access point 204-5. As stated previously, the probe response may timeout before the station 202 has time to respond. Alternately, the transmission of the ACK may fail.

As shown, access point 204-6 sends a probe response to the station 202, and receives an ACK back. Accordingly, the access point 204-6 also logs the ACK in its probe response history. The ACK sent to access point 204-6 represents the end of the first probe response cycle. At the end of the first probe response cycle, the station 202 has acknowledged it has discovered access points 204-1, 204-2, 204-3, and 204-6.

The second probe response cycle begins with the station 202 broadcasting another probe request. In some embodiments, the scanning station 202 may specify in the probe request an indicator whether the broadcasting station 202 expects the receiving access point 204-1 to 204-6 perform the probe response protocol according to the present techniques, or according to another standard, such as IEEE 802.11. In some embodiments, the broadcast probe request may include a threshold time value that access points 204-1 to 204-6 may use to determine whether the acknowledgement to the last probe response was sent recently. The threshold time value may be included in the message both as an indicator that probe response is performed according to the present techniques are used. In such a scenario, a threshold time value of zero may indicate the probe response protocol according to the present techniques is not indicated. As an alternative to this selection approach, the broadcast probe request may include the threshold time value and a yes-no indicator.

If this indicator is present, the access points 204-1 to 204-6 are being instructed to not respond to this probe request if the station 202 has recently acknowledged a probe response from the particular access point. Accordingly, events 220, 222, 224, 226 represent the access points 204-1, 204-2, 204-3, 204-6, respectively making the determination that a probe response has been recently acknowledged from the station 202. Recently means that the timestamp of the current probe request is within the specified threshold time of the timestamp recorded for the ACK during the previous probe response cycle. Thus, there is no probe response sent from the access points 204-1, 204-2, 204-3, 204-6 to the station 202. In contrast, access points 204-4, 204-5 were not acknowledged in the previous probe response cycle. As such, the access points 204-4, 204-5 do not have a recent probe-response history with the station 202. Thus, the access points 204-4, 204-5 send probe responses to the station, and receive ACKs in response. Upon receiving the ACKs, the access points 204-4, 204-5 update their probe-response histories to document the receipt of these ACKs.

Thus, only access points 204-4, 204-5, which were not discovered by the station 202 within the previous probe response cycle, respond to the second probe request. Accordingly, the number of redundant probe responses is reduced to zero in this and subsequent probe response cycles. As the threshold time passes for each of the access points 204-1 to 204-6, new probe responses may be sent in response to future probe requests.

Figure 3:
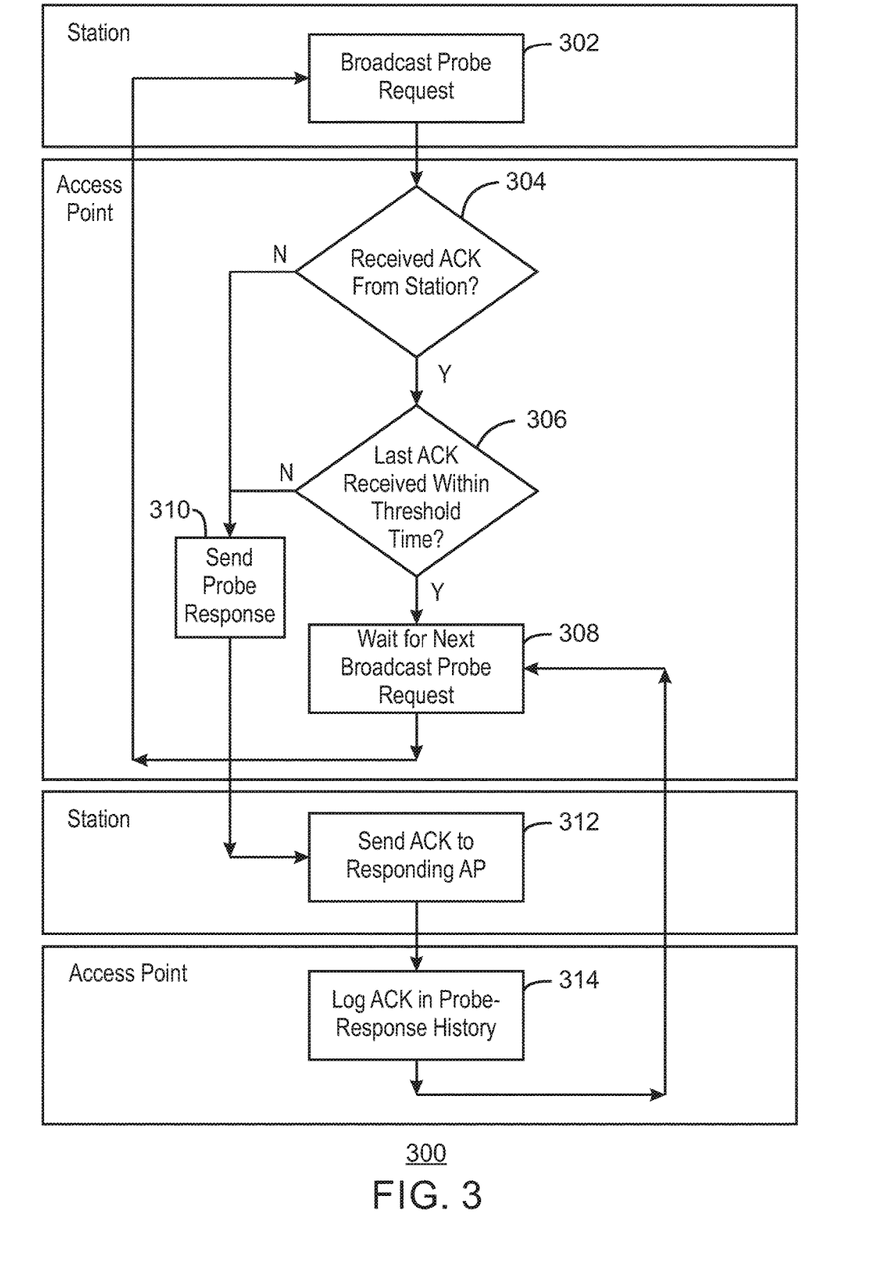
FIG. 3 is a message flow diagram between a station and an access point in a wireless communication network with probe response.

FIG. 3 is a method 300 for a wireless communication network with probe response. The method 300 may be performed by a station and an access point, such as station 102 and access points 104. The method 300 should not be interpreted as meaning that the blocks are necessarily performed in the order shown. Further, fewer or greater actions can be included in the method 300 depending on the design considerations of a particular implementation.

At block 302, the station 102 may broadcast a probe request to all access points 104 within the communication range of the station 102. As stated previously, the station 102 may have control over the probe response behavior of the access points. For example, when the station 102 generates a probe request, the station may specify a threshold time value to indicate that probe responses are indicated if an ACK to a previous probe response has not occurred within the specified threshold of time.

At block 304, in response to the probe request, the access point 104 checks its probe-response history to determine if an ACK has previously been received from the requesting station 102. If an ACK has not been previously received, control flows to block 310, described in greater detail below.

However, if an ACK has been previously received, at block 306, the access point 104 determines whether the previously received ACK was received within the threshold of time specified in the probe request. If the ACK was received within the specified threshold of time, control flows to block 308, where the access point 104 waits for another probe request. If the ACK was not received within the specified threshold, or not received at all, control flows to block 310, where the access point 104 sends a probe response to the requesting station 102. At block 312, in response to the probe response, the station 102 sends an ACK to the responding access point 104. At block 314, in response to the ACK, the access point 104 logs the ACK in the access point's probe-response history.

The method 300 may provide backward compatibility with access points that do not support the probe response protocol according to the present techniques. Backward compatibility is provided so that such access points do not consult a probe-response history, but merely send redundant probe responses. These redundant probe responses are handled by the station 102 according to the IEEE 802.11 standard, resulting in the redundancies described above, as would be expected with access points that do not perform the probe response protocol described herein.

The method 300 may be useful for the Wi-Fi Alliance's (WFA's) Optimized Connectivity Experience (OCE) program. The OCE program encourages new protocols for fast initial link setup (FILS). FILS is the process starting from when the station 102 first broadcasts a probe request, until the moment when the station 102 and an access point 104 establish have secured a wireless communication link ready for the exchange of data. OCE encourages the development of faster FILS, such as implementing the techniques described herein. The OCE provides a management frame data structure that includes a number of elements that may be used, and expanded, to facilitate more efficient FILS, such as the FILS request parameters element.

The FILS request parameters element includes the actual data values that are passed between the station 102 and the access points 104, such as the threshold time. According to the IEEE 802.11 standard, the FILS request parameters element has an Element ID=255, with an Element ID Extension=2 (the OCE allows for up to two additional parameters to facilitate faster setups). In embodiments, the FILS request parameters element is expanded to include an optional parameter to hold the threshold time value. The threshold time may be represented in microseconds (msecs).

Table 1 shows an example FILS request parameters element.

TABLE 1

| Element ID (1) | Length (1) | Element ID Extension (1) | Parameter Control Bitmap (1) | FILS Criteria (0 or 1) | ... | Hashed Domain Information (0 or 2) | Threshold Time (0 or 1) |
| --- | --- | --- | --- | --- | --- | --- | --- |

The (n) at the bottom of each cell of Table 1 represents the size of the named field. The first four fields are fixed-length, single byte, parameter values may vary in length, if they are even present. The parameter sizes are typically expressed as 0 or n bytes, meaning that the length of the parameter value is zero when not present. Alternatively, when present, the length of the parameter size is the n length in bytes. The FILS request parameters element includes management fields, and the actual parameter values, both stored as bytes of data. The management fields include a 1-byte Element ID (a unique identifier), a 1-byte Length (which represents the total length of the FILS request parameters element, including the management and parameter fields), a 1-byte Element ID Extension, a 1-byte Parameter Control Bitmap, and the parameter values themselves. The Element ID Extension represents how far the FILS request parameters element is extended.

The remaining fields in Table 1 represent the parameter values themselves. For purposes of clarity, not all the parameters included in the FILS request parameters element are shown in Table 1. In addition to the parameters shown in Table 1 (FILS Criteria, Hashed Domain Information, and, in embodiments, Threshold Time), the other parameters include Max Delay Limit (0 or 1), Minimum Data Rate (0 or 3), received channel power indicator (RCPI) Limit (0 or 1), organizationally unique identifier (OUI) Response Criteria (0 or 2), and Max Channel Time.

An example Parameter Control Bitmap is shown in Table 2.

TABLE 2

| FILS Criteria (1) | Max delay limit (1) | Minimum Data rate (1) | RCPI Limit (1) | OUI Response Criteria (1) | Max Channel Time (1) | Hashed Domain Information (1) | Threshold Time (1) |
|---|---|---|---|---|---|---|---|

The Parameter Control Bitmap is 1-byte, and includes 1 bit for each potential parameter value that may be included in the FILS request parameters element. As shown in Table 2, there may be one bit for each of the following parameters: FILS Criteria, Max Delay Limit, Minimum Data Rate, RCPI Limit, OUI Response Criteria, Max Channel Time, Hashed Domain Information, and the Threshold Time. A bit that is set in the Parameter Control Bitmap indicates its associated parameter value is included in the FILS request parameters element. If the bit is not set, the corresponding parameter is not included in the FILS request parameters element. Using the FILS request parameters element, the station 102 and access points can perform the probe response protocol according to the present techniques.

Figure 4:
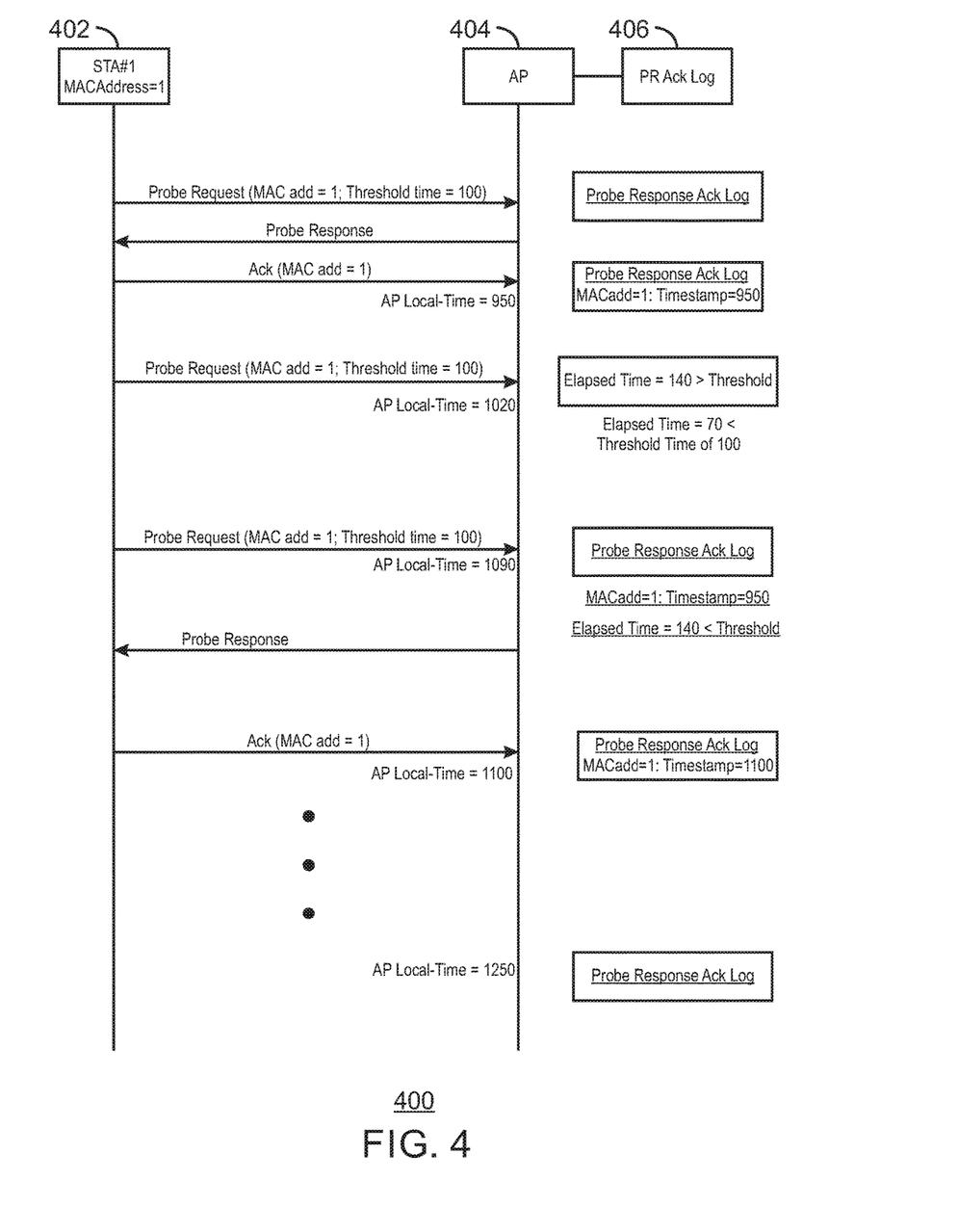
FIG. 4 is a message flow diagram between a station and multiple access points in a wireless communication network with probe response.

FIG. 4 is a message flow diagram 400 of a probe response between a station 402 and one access point 404 in the wireless communication network 100. The station 402 (STA) has a MAC Address of 1. The access point 404 is associated with a probe response ACK log 406. The probe response ACK log 406 is a log of the ACKs of probe responses between the access point 404 and any stations. The probe response ACK log 406 represents the probe response history for access point 404. At the beginning of the message flow 400, the probe response ACK log 406 may be empty.

The first message is a probe request from the station 402, which is received by the AP 404. If the probe response ACK log 406 is empty, the AP 404 transmits a probe response. The station 402 acknowledges the probe response. The ACK includes the MAC address for station 402. The ACK is received at access point local time 950. Accordingly, the access point 204 logs the ACK by recording the MAC address and AP local time. The AP local time may be stored as a timestamp. While the timestamp is represented as a simplified time value for clarity in FIG. 4, it is understood that the timestamp may include an appended date.

The next message is another probe request from the station 402. The probe request includes the MAC address of the station, and a threshold time value of 100 msecs. By including the threshold time value in the FILS request parameters element, the station 402 is requesting that listening access points not respond if they have provided a probe response in the previous 100 msecs.

Upon receiving the probe request at AP local time 1020, the access point 404 checks the probe response ACK log 406 for an entry recording a probe response ACK from a station with a MAC address of 1 in the previous 100 msecs. In this example, there is a matching MAC Address entry in the probe response ACK log 406. As such, the access point 404 calculates the difference between the AP local time (1020), and the time since the probe response ACK was received. The elapsed time is 70 msecs (1020−950=70), which is shorter than the threshold time of 100 msecs. The access point 404 thus does not respond to the probe request.

The next message is another probe request, with the threshold time value specified. Upon receiving the probe request at AP local time 1090, the access point 404 checks the probe response ACK log 406 for an entry for this station in the previous 100 msecs. In this example, there is a matching MAC Address entry. However, the elapsed time between AP local time 1090 and the timestamp of the ACK is now 140 msecs, which is outside the threshold time specified in the probe request. The AP 404 thus provides a probe response. Upon receiving the probe response, the station 402 sends an ACK to the access point 404. The ACK, received at AP local time 1100, is logged in the probe response ACK log 406. The previous entry for timestamp 950 may be deleted from the probe response ack log 406, or overwritten.

After this ACK, there are no further messages. However, there is one remaining probe response ACK log 406, which represents a log that has been aged. In computing, ageing is the process of deleting old data to make room for new data, and to improve efficiency. Accordingly, in some embodiments, the access point 404 may delete entries from the probe response ACK log 406 when they can be considered to have become old. In this example, an entry in the probe response ACK log 406 may be considered old after 150 msecs, and be deleted.

Figure 5:
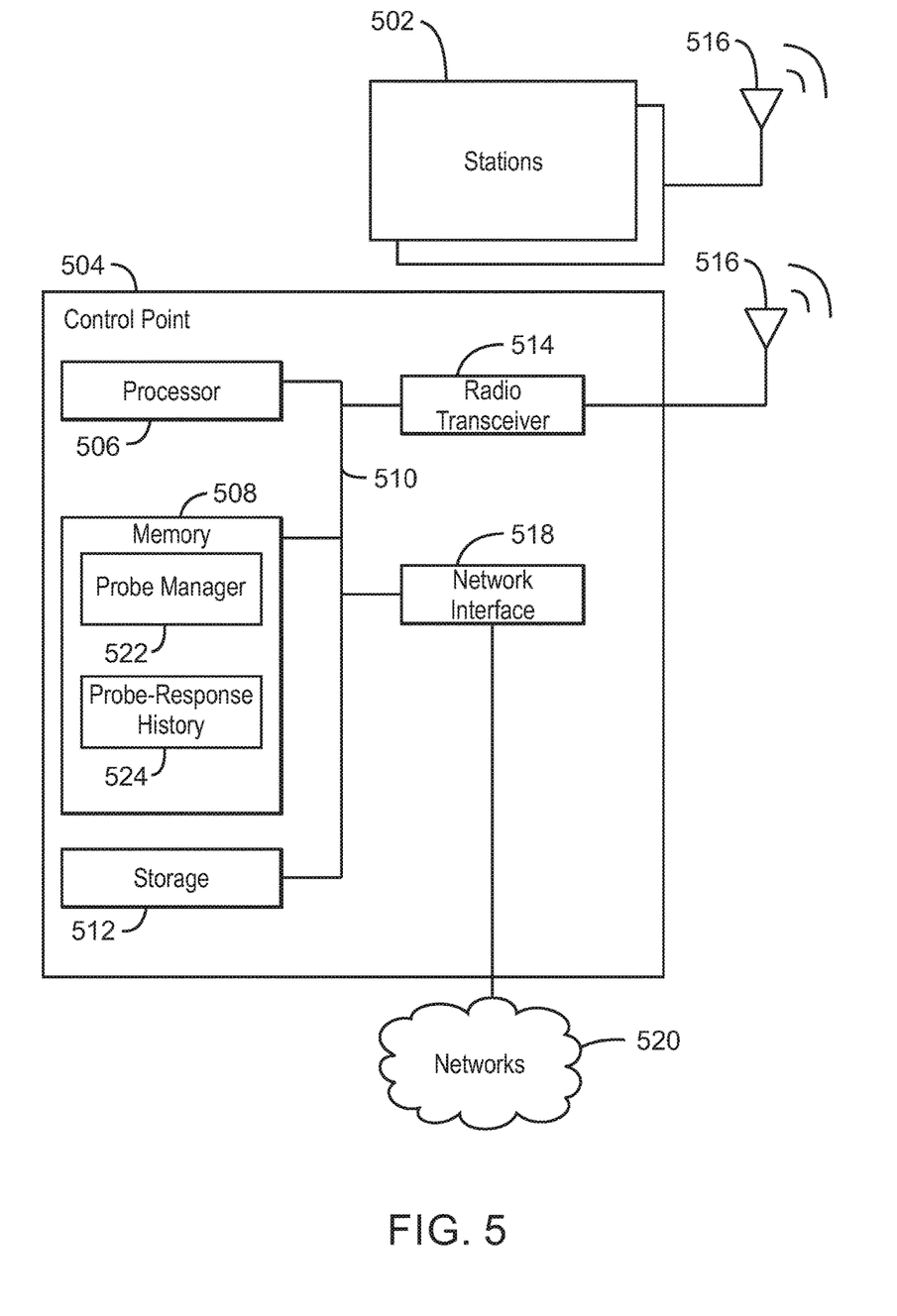
FIG. 5 is a block diagram of a wireless communication network with probe response.

FIG. 5 is a block diagram of a wireless communication network 500 with probe response. The network 500 may include one or more stations 502 and one or more control points 504. The control points 504 are access points, such as access points 104, and perform the probe response protocol described herein with one or more of the stations 502. The stations 502 may be any electronic devices that are configured for wireless communications using the 802.11 protocol. Examples of stations include desktop computers, laptop computers, tablet computers, smart phones, televisions, Internet of Things (IoT) devices, and others. The control points 504 enable the stations 502 to connect to a network 520. The network 520 may be one or a combination of communication networks, such as a Local Area Network (LAN), a wide area network (WAN), the Internet, and the like.

The components of the control point 504 may be implemented as Integrated Circuits (ICs), portions thereof, discrete electronic devices, or other modules, logic, hardware, software, firmware, or a combination thereof adapted in the system, or as components otherwise incorporated within a chassis of a larger system. However, some of the components shown may be omitted, additional components may be present, and different arrangement of the components shown may occur in other implementations.

The control point 504 may include a processor 506, which may be a microprocessor, a multi-core processor, a multi-threaded processor, an ultra-low voltage processor, an embedded processor, or other known processing element. The processor 506 may be a part of a system on a chip (SoC) in which the processor 506 and other components are formed into a single integrated circuit, or a single package.

The processor 506 may communicate with a system memory 508 over a bus 510. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be configured as a DDR3LM package or an LPDDR2 or LPDDR3 memory, which is soldered onto a motherboard via a ball grid array (BGA).

The control point 504 also includes a storage device 512 for persistent storage of information such as data, applications, operating systems and so forth. The storage device 512 may contain various components to enable the control point 504 to manage communications within the network 500. The storage device 512 may be couple to the processor 506 via the bus 510. The storage device 512 may be implemented via any type of non-transitory, machine-readable medium, such as a solid state disk drive (SSDD), a hard drive, and the others. In some examples, the storage device 512 may be implemented using a micro hard disk drive (HDD). Further, any number of new technologies may be used for the storage device 512 in addition to, or instead of, the technologies described, such resistance change memories, phase change memories, holographic memories, or chemical memories, among others.

The components may communicate over the bus 510. The bus 510 may include any number of technologies, including industry standard architecture (ISA), extended ISA (EISA), peripheral component interconnect (PCI), peripheral component interconnect extended (PCIx), PCI express (PCIe), or any number of other technologies. The bus 510 may be a proprietary bus, for example, used in a SoC based system. Other bus systems may be included, such as an I2C interface, an SPI interface, and point to point interfaces, among others.

The bus 510 may couple the processor 506 to a radio transceiver 514, for communications with the stations 502 and other control points 504. The radio transceiver 514 may include any number of frequencies and protocols, such as a WLAN unit used to implement Wi-Fi™ communications in accordance with the Institute of Electrical and Electronics Engineers (IEEE) 802.11 standard. The radio transceiver 514 may be capable of communicating over the mm wave frequency band, for example, the 60 GHz frequency band. The radio transceiver 514 may be capable of communicating over any other suitable wireless communication frequency band, in addition to or instead of the 60 GHz frequency band. In one example, radio transceiver 514 may include a multi-band wireless communication unit capable of communicating over two or more wireless communication frequency bands, e.g., the 60 GHz frequency band and the 2.4/5 GHz frequency band.

The radio transceiver 514 may be coupled to one or more antennas 516 or sets of antennas 516. The antennas 516 may include, for example, an internal and/or external RF antenna, a dipole antenna, a monopole antenna, an omni-directional antenna, a micro-strip antenna, a diversity antenna, or other type of antenna suitable for transmitting and receiving wireless communication signals.

The bus 510 may also couple the processor 506 to a network interface 518 that enables the control point 504 to connect to the network 520. The control point 504 and stations 502 share a single communication channel. To avoid collisions, the control point 504 and stations 502 may be configured to implement a Carrier Sense Multiple Access with Collision Avoidance (CSMA/CA) protocol. In accordance with CSMA/CA, stations are allowed to transmit only when the communication channel is sensed to be idle.

In some embodiments, the memory 508 includes a Probe manager 522, which performs techniques as described with respect to the access points 104, 404 referenced in FIGS. 1 and 4. Specifically, if the station 502 sends a probe request that is received by the control point 504, and specifies a threshold time within which the control point 504 is not to respond, the probe manager 522 consults the probe-response history 524 to determine if there is an entry for an ACK received from this station 502 within the specified threshold time. The probe manager 522 only sends a probe response if there is no such entry in the probe-response history 524.

Figure 6:
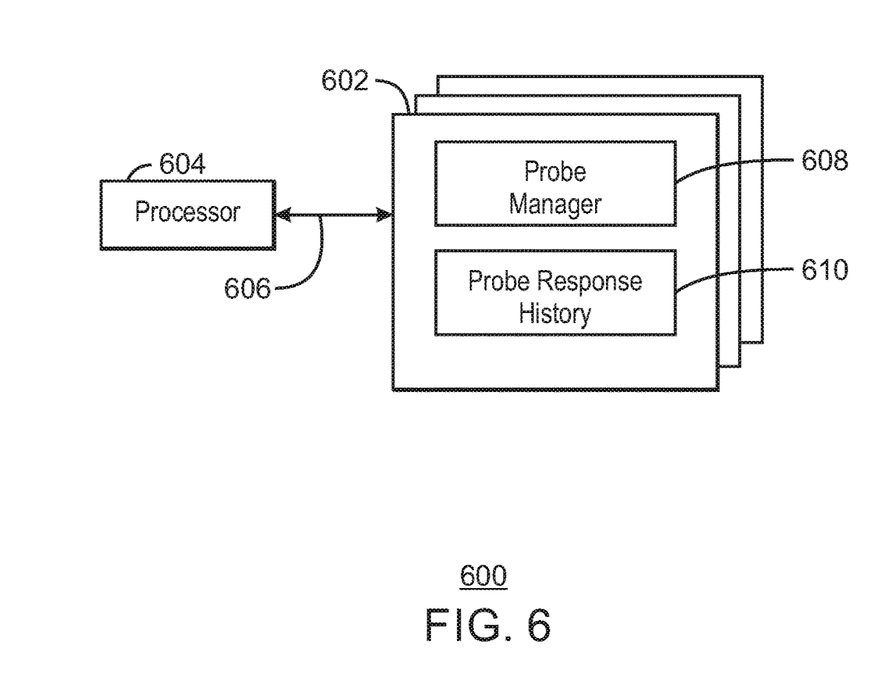
FIG. 6 is a block diagram showing a computer system containing one or more non-transitory, computer-readable media for a wireless communication network with probe response.

FIG. 6 is a block diagram showing a computer system 600 containing one or more non-transitory, computer-readable media 602 for a wireless communication network with probe response. The computer readable media 602 may be accessed by a processor 604 over a computer bus 606. The processor 604 may be any computer processor, such as the processor described with respect to FIG. 5. Referring back to FIG. 6, the computer-readable media 602 may include code configured to direct the processor 604 to perform methods and embodiments described herein. In some embodiments, the computer-readable media 602 may be non-transitory computer-readable media. In some examples, the computer readable media 602 may be storage media. However, in any case, the computer-readable media do not include transitory media such as carrier waves, signals, and the like.

The block diagram of FIG. 6 is not intended to indicate that the computer readable media 602 is to include all of the components shown in FIG. 6. Further, the computer-readable media 602 may include any number of additional components not shown in FIG. 6, depending on the details of the specific implementation.

Various features and components discussed herein may be stored on one or more computer readable media 602, as indicated in FIG. 6. For example, a probe manager 608 may maintain a probe response history 610, wherein a record of probe response ACKs. The controller 608 can establish individual or broadcast TWTs that define service periods within which stations and access points may transfer data. The access points may establish broadcast TWTs by advertising TWT elements specifying their, and other APs', service periods. Stations and APs may negotiate with each other to establish individual TWTs. Accordingly, stations under individual or broadcast TWTs, may wake at the target wake time, and upload whatever data the stations may have collected.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

Reference in the specification to "an example", "some examples", "one embodiment", "some embodiments", "an embodiment", etc. of the disclosed subject matter means that a particular feature, structure, or characteristic described in connection with the embodiment or example is included in at least one embodiment or example of the disclosed subject matter. Thus, the phrase "in one embodiment" or "one example" may appear in various places throughout the specification, but the phrase may not necessarily refer to the same embodiment.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, graphics processing units, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

EXAMPLES

Example 1 is an apparatus for a wireless network. The apparatus includes a memory including executable instructions, and a processor that executes the executable instructions. The processor determines, in response to a probe request from a station, to respond to the probe request based on whether the station acknowledges, within a specified threshold of time, a previous probe response from an access point. The processor also transmits a probe response to the station based on the determination.

Example 2 includes the apparatus of example 1. Determining to respond comprises determining an acknowledgement log of the access point does not comprise an entry for the station.

Example 3 includes the apparatus of example 1. Therein, the processor generates an entry to an acknowledgement log of the access point in response to a previous acknowledgement from the station responding to a previous probe response from the access point. The processor also records the entry in the acknowledgment log.

Example 4 includes the apparatus of example 3. The entry includes an identifier (ID) of the station and a time of the previous acknowledgement.

Example 5 includes the apparatus of example 3. Determining to respond is based on whether the access point receives the probe request within the specified threshold of time from the previous acknowledgement.

Example 6 includes the apparatus of example 5. Determining the station has not previously acknowledged the previous broadcast probe response from the access point within a threshold time of the current time is based on the entry.

Example 7 includes the apparatus of example 1. The access point determines not to respond based on the station acknowledging, within the specified threshold of time, the previous probe response.

Example 8 includes the apparatus of example 1. Example 8 also includes generating an additional entry to the acknowledgment log of the access point based on when the access point receives the acknowledgment.

Example 9 includes the apparatus of example 1, wherein the processor creates a wireless network connection between the station and the access point.

Example 10 includes one or more tangible, non-transitory computer readable media to implement probe responses in a wireless communication network, comprising a plurality of instructions that, in response to being executed on a processor, cause the processor to determine, in response to a probe request from a station, to respond to the probe request based on whether the station acknowledges, within a specified threshold of time, a previous probe response from an access point. The instructions also cause the processor to transmit a probe response to the station based on the determination.

Example 11 includes the one or more tangible, non-transitory computer readable media of example 10, wherein determining to respond comprises determining an acknowledgement log of the access point does not comprise an entry for the station.

Example 12 includes the one or more tangible, non-transitory computer readable media of example 10. The processor generates an entry to an acknowledgment log of the access point in response to a previous acknowledgement from the station responding to the previous probe request. The processor also records the entry in the acknowledgement log.

Example 13 includes the one or more tangible, non-transitory computer readable media of example 12. The entry includes an identifier (ID) of the station, and a time when the access point determines the station previously acknowledges the previous broadcast probe response from the access point.

Example 14 includes the one or more tangible, non-transitory computer readable media of example 13. Determining to respond is based on whether the access point receives the probe request within the specified threshold of time from the previous acknowledgement.

Example 15 includes the one or more tangible, non-transitory computer readable media of example 14. Determining the station has not previously acknowledged the previous probe response from the access point within a threshold time of the current time is based on the entry.

Example 16 includes the one or more tangible, non-transitory computer readable media of example 10. The access point determines not to respond based on the station acknowledging, within the specified threshold of time, the previous probe response.

Example 17 includes the one or more tangible, non-transitory computer readable media of example 10. The instructions also cause the processor to generate an additional entry to the acknowledgment log of the access point based on when the one access point receives the acknowledgement.

Example 18 includes the one or more tangible, non-transitory computer readable media of example 10. The processor creates a wireless network connection between the station and the access point.

Example 19 includes an apparatus for a wireless network. The apparatus includes a memory including executable instructions, a processor that executes the executable instructions. The processor generates a probe request comprising an indicator that an access point respond to the probe request if the station generating the probe request has not acknowledged a probe response from the access point within a specified threshold of time. The processor transmits the probe request.

Example 20 includes the apparatus of example 19 includes transmitting an acknowledgment to the access point in response to receiving a probe response to the probe request.

Example 21 includes a method for providing probe responses in a wireless communication network. The method includes determining, in response to a probe request from a station, to respond to the probe request based on whether the station acknowledges, within a specified threshold of time, a previous probe response from an access point. The method includes transmitting a probe response to the station based on the determination.

Example 22 includes the method of example 21. The method includes determining to respond by determining the acknowledgement log does not include an entry for the station in an acknowledgment log of the one access point.

Example 23 includes the method of example 21, and generating an entry to an acknowledgment log of the one access point in response to a previous acknowledgement from the station responding to the previous probe request. The method includes recording the entry in a computer memory of the one access point. the entry associates the previous acknowledgement with a previous probe response to the previous broadcast probe request.

Example 24 includes the method of example 23. The entry comprises an identifier (ID) of the station and a time when the one access point determines the station previously acknowledges the previous broadcast probe response from the one access point.

Example 25 includes the method of example 24. Determining to respond is based on when the station previously acknowledges the previous broadcast response.

Example 26 includes the method of example 25. Determining the station has not previously acknowledged the previous broadcast probe response from the access point within a threshold time of the current time is based on the entry.

Example 27 includes the method of example 21 includes broadcasting the probe request. The method includes transmitting an acknowledgement to the probe response.

Example 28 includes the method of example 21 includes generating an additional entry to the acknowledgment log of the one access point based on when the one access point receives the acknowledgement.

Example 29 includes the method of example 21 and creating a wireless network connection between the station and the access point.

Example 30 includes an apparatus for a wireless network includes a memory including executable instructions and a processor that executes the executable instructions. The processor determines, in response to a probe request from a station, to respond to the probe request based on whether the station acknowledges, within a specified threshold of time, a previous probe response from an access point. The processor transmits a probe response to the station based on the determination.

Example 31 includes the apparatus of example 30. In some examples, determining to respond includes determining an acknowledgement log of the access point does not include an entry for the station.

Example 32 includes the apparatus of example 30 or 31. In some examples, the processor generates an entry to the acknowledgement log of the access point in response to a previous acknowledgement from the station responding to a previous probe response from the access point and records the entry in the acknowledgment log.

Example 33 includes the apparatus of example 32. In some examples, the entry includes an identifier (ID) of the station and a time of the previous acknowledgement.

Example 34 includes the apparatus of example 32. In some examples, determining to respond is based on whether the access point receives the probe request within the specified threshold of time from the previous acknowledgement.

Example 35 includes the apparatus of example 34. In some examples, determining the station has not previously acknowledged the previous broadcast probe response from the access point within a threshold time of the current time is based on the entry.

Example 36 includes the apparatus of example 30. In some examples, the access point determines not to respond based on the station acknowledging, within the specified threshold of time, the previous probe response.

Example 37 includes the apparatus of example 30. In some examples the processor generates an additional entry to the acknowledgment log of the access point based on when the access point receives the acknowledgment.

Example 38 includes the apparatus of example 30. In some examples, the processor creates a wireless network connection between the station and the access point.

Example 39 includes one or more tangible, non-transitory computer readable media to implement probe responses in a wireless communication network, including a plurality of instructions that, in response to being executed on a processor, cause the processor to determine, in response to a probe request from a station, to respond to the probe request based on whether the station acknowledges, within a specified threshold of time, a previous probe response from an access point. The processor transmits a probe response to the station based on the determination.

Example 40 includes the one or more tangible, non-transitory computer readable media of example 39. In some examples, determining to respond includes determining an acknowledgement log of the access point does not include an entry for the station.

Example 41 includes the one or more tangible, non-transitory computer readable media of examples 39 or 40. The processor generates an entry to the acknowledgment log of the access point in response to a previous acknowledgement from the station responding to the previous probe request and records the entry in the acknowledgement log.

Example 42 includes the one or more tangible, non-transitory computer readable media of example 41. In some examples, the entry includes an identifier (ID) of the station and a time when the access point determines the station previously acknowledges the previous broadcast probe response from the access point.

Example 43 includes the one or more tangible, non-transitory computer readable media of example 42. In some examples, determining to respond is based on whether the access point receives the probe request within the specified threshold of time from the previous acknowledgement.

Example 44 includes the one or more tangible, non-transitory computer readable media of example 43. In some examples, determining the station has not previously acknowledged the previous probe response from the access point within a threshold time of the current time is based on the entry.

Example 45 includes the one or more tangible, non-transitory computer readable media of example 39. In some examples, the access point determines not to respond based on the station acknowledging, within the specified threshold of time, the previous probe response.

Example 46 includes the one or more tangible, non-transitory computer readable media of example 39. In some examples, the processor generates an additional entry to the acknowledgment log of the access point based on when the one access point receives the acknowledgement.

Example 47 includes the one or more tangible, non-transitory computer readable media of example 39. In some examples, the processor creates a wireless network connection between the station and the access point.

Example 48 includes an apparatus for a wireless network includes a memory including executable instructions and a processor that executes the executable instructions to generate a probe request including an indicator that an access point respond to the probe request if the station generating the probe request has not acknowledged a probe response from the access point within a specified threshold of time and transmit the probe request.

Example 49 includes the apparatus of example 48. In some examples, the processor transmits an acknowledgment to the access point in response to receiving a probe response to the probe request.

Example 50 includes an apparatus for providing probe responses in a wireless communication network includes means to determine, in response to a probe request from a station, to respond to the probe request based on whether the station acknowledges, within a specified threshold of time, a previous probe response from an access point and means to transmit a probe response to the station based on the determination.

Example 51 includes the apparatus of example 50. In some examples, determining to respond includes determining the acknowledgement log does not include an entry for the station in an acknowledgment log of the one access point.

Example 52 includes the apparatus of examples 50 or 51 includes means to generate an entry to the acknowledgment log of the one access point in response to a previous acknowledgement from the station responding to the previous probe request and means to record the entry in a computer memory of the one access point. The entry associates the previous acknowledgement with a previous probe response to the previous broadcast probe request.

Example 53 includes the apparatus of example 52. In some examples, the entry includes an identifier (ID) of the station and a time when the one access point determines the station previously acknowledges the previous broadcast probe response from the one access point.

Example 54 includes the method of example 53. In some examples, determining to respond is based on when the station previously acknowledges the previous broadcast response.

Example 55 includes an apparatus for a wireless network includes a memory including executable instructions and a processor that executes the executable instructions to determine, in response to a probe request from a station, to respond to the probe request based on whether the station acknowledges, within a specified threshold of time, a previous probe response from an access point and transmit a probe response to the station based on the determination.

Example 56 includes the apparatus of example 55. In some examples, determining to respond includes determining an acknowledgement log of the access point does not include an entry for the station.

Example 57 includes the apparatus of example 55 or 56. In some examples, the processor generates the entry to the acknowledgement log of the access point in response to a previous acknowledgement from the station responding to a previous probe response from the access point and records the entry in the acknowledgment log.

Example 58 includes the apparatus of examples 56 or 57. The entry includes an identifier (ID) of the station and a time of the previous acknowledgement.

Example 59 includes the apparatus of example 57. In some examples, determining to respond is based on whether the access point receives the probe request within the specified threshold of time from the previous acknowledgement.

Example 60 includes the apparatus of example 59. In some examples, determining the station has not previously acknowledged the previous broadcast probe response from the access point within a threshold time of the current time is based on the entry.

Example 61 includes the apparatus of example 55. In some examples, the processor creates a wireless network connection between the station and the access point.

Example 62 includes one or more tangible, non-transitory computer readable media to implement probe responses in a wireless communication network, including a plurality of instructions that, in response to being executed on a processor, cause the processor to determine, in response to a probe request from a station, to respond to the probe request based on whether the station acknowledges, within a specified threshold of time, a previous probe response from an access point and transmit a probe response to the station based on the determination.

Example 63 includes the one or more tangible, non-transitory computer readable media of example 62. In some examples, determining to respond includes determining an acknowledgement log of the access point does not include an entry for the station.

Example 64 includes the one or more tangible, non-transitory computer readable media of examples 62 or 63. The processor generates an entry to the acknowledgment log of the access point in response to a previous acknowledgement from the station responding to the previous probe request and records the entry in the acknowledgement log.

Example 65 includes the one or more tangible, non-transitory computer readable media of example 64. In some examples, determining to respond is based on whether the access point receives the probe request within the specified threshold of time from the previous acknowledgement.

Example 66 includes an apparatus for providing probe responses in a wireless communication network includes means to determine, in response to a probe request from a station, to respond to the probe request based on whether the station acknowledges, within a specified threshold of time, a previous probe response from an access point and means to transmit a probe response to the station based on the determination.

Example 67 includes the apparatus of example 66. In some examples, determining to respond includes determining the acknowledgement log does not include an entry for the station in an acknowledgment log of the one access point.

Example 68 includes the apparatus of examples 66 or 67 includes means to generate the entry to the acknowledgment log of the one access point in response to a previous acknowledgement from the station responding to the previous probe request and means to record the entry in a computer memory of the one access point. The entry associates the previous acknowledgement with a previous probe response to the previous broadcast probe request.

Example 69 includes the apparatus of examples 67 or 68. The entry includes an identifier (ID) of the station and a time when the one access point determines the station previously acknowledges the previous broadcast probe response from the one access point.

Example 70 includes an apparatus for a wireless network includes a memory including executable instructions and a processor that executes the executable instructions to determine, in response to a probe request from a station, to respond to the probe request based on whether the station acknowledges, within a specified threshold of time, a previous probe response from an access point and transmit a probe response to the station based on the determination.

Example 71 includes the apparatus of example 70. In some examples, determining to respond includes determining an acknowledgement log of the access point does not include an entry for the station.

Example 72 includes the apparatus of examples 70 or 71. The processor generates an entry to the acknowledgement log of the access point in response to a previous acknowledgement from the station responding to a previous probe response from the access point and records the entry in the acknowledgment log.

Example 73 includes the apparatus of example 72. In some examples, the entry includes an identifier (ID) of the station and a time of the previous acknowledgement.

Example 74 includes the apparatus of example 72. In some examples, determining to respond is based on whether the access point receives the probe request within the specified threshold of time from the previous acknowledgement.

Example 75 includes the apparatus of example 74. In some examples, determining the station has not previously acknowledged the previous broadcast probe response from the access point within a threshold time of the current time is based on the entry.

Example 76 includes the apparatus of example 70. In some examples, the access point determines not to respond based on the station acknowledging, within the specified threshold of time, the previous probe response.

Example 77 includes the apparatus of example 70, including generating an additional entry to the acknowledgment log of the access point based on when the access point receives the acknowledgment.

Example 78 includes the apparatus of example 70. In some examples, the processor creates a wireless network connection between the station and the access point.

Example 79 includes an apparatus for a wireless network includes a memory including executable instructions and a processor that executes the executable instructions to generate a probe request including an indicator that an access point respond to the probe request if the station generating the probe request has not acknowledged a probe response from the access point within a specified threshold of time and transmit the probe request.

Example 80 includes the apparatus of example 79, including transmitting an acknowledgment to the access point in response to receiving a probe response to the probe request.

Example 81 includes a method for providing probe responses in a wireless communication network includes determining, in response to a probe request from a station, to respond to the probe request based on whether the station acknowledges, within a specified threshold of time, a previous probe response from an access point and transmitting a probe response to the station based on the determination.

Example 82 includes the method of example 81. In some examples, determining to respond includes determining the acknowledgement log does not include an entry for the station in an acknowledgment log of the one access point.

Example 83 includes the method of examples 81 or 82 includes generating an entry to the acknowledgment log of the one access point in response to a previous acknowledgement from the station responding to the previous probe request and recording the entry in a computer memory of the one access point. The entry associates the previous acknowledgement with a previous probe response to the previous broadcast probe request.

Example 84 includes the method of example 83. In some examples, the entry includes an identifier (ID) of the station and a time when the one access point determines the station previously acknowledges the previous broadcast probe response from the one access point.

Example 85 includes the method of example 84. In some examples, determining to respond is based on when the station previously acknowledges the previous broadcast response.

Example 86 includes the method of example 85. In some examples, determining the station has not previously acknowledged the previous broadcast probe response from the access point within a threshold time of the current time is based on the entry.

Example 87 includes the method of example 81 includes broadcasting the probe request and transmitting an acknowledgement to the probe response.

Example 88 includes the method of example 81, including generating an additional entry to the acknowledgment log of the one access point based on when the one access point receives the acknowledgement.

Example 89 includes the method of example 81, including creating a wireless network connection between the station and the access point.

What is claimed is:

1. An access point for a wireless network comprising:
   a memory comprising executable instructions; and
   a processor that executes the executable instructions to enable a station to discover the access point, the processor to:
   receive a probe request from the station;
   in response to the probe request, determine whether to respond to the probe request based on whether the access point received a previous acknowledgment from the station in response to a previous probe response from the access point within a specified threshold of time between the previous acknowledgement and the probe request;
   transmit a probe response to the station if the access point did not receive the previous acknowledgment from the station within the specified threshold of time; and
   do not transmit the probe response to the station if the access point did receive the previous acknowledgment from the station within the specified threshold of time.

2. The apparatus of claim 1, wherein determining whether to respond comprises determining that an acknowledgement log of the access point does not include an entry for the station.

3. The apparatus of claim 1, wherein the processor is to:
   generate an entry to an acknowledgement log of the access point in response to
      the previous acknowledgement from the station responding to
      previous probe response from the access point; and
   record the entry in the acknowledgment log.

4. The apparatus of claim 3, wherein the entry includes:
   an identifier (ID) of the station; and
   a time of the previous acknowledgement.

5. The apparatus of claim 3, wherein determining whether the access point received a previous acknowledgment from the station in response to the previous probe response from the access point within the specified threshold of time between the previous acknowledgement and the probe request is based on the entry.

6. The apparatus of claim 1, wherein the processor create a wireless network connection between the station and the access point.

7. One or more tangible, non-transitory computer readable media to enable a station to discover an access point in a wireless communication network, comprising a plurality of instructions that, in response to being executed on a processor, cause the processor to:
   receive a probe request from the station;
   in response to the probe request from the station, determine whether to respond to the probe request based on whether the access point received a previous acknowledgment from the station in response to a previous probe response from the access point within a specified threshold of time between the previous acknowledgement and the probe request; and
   transmit a probe response to the station if the access point did not receive the previous acknowledgment from the station within the specified threshold of time; and
   do not transmit the probe response to the station if the access point did receive the previous acknowledgment from the station within the specified threshold of time.

8. The one or more tangible, non-transitory computer readable media of claim 7, wherein determining to respond comprises determining that an acknowledgement log of the access point does not include an entry for the station.

9. The one or more tangible, non-transitory computer readable media of claim 7, wherein the processor is to:
   generate an entry to an acknowledgment log of the access point in response to the previous acknowledgement from the station responding to the previous probe request; and
   record the entry in the acknowledgement log.

10. The one or more tangible, non-transitory computer readable media of claim 9, wherein the entry includes:
  an identifier (ID) of the station; and
  a time when the access point determines the station previously acknowledges the previous broadcast probe response from the access point.

11. The one or more tangible, non-transitory computer readable media of claim 10, wherein determining the access point received a previous acknowledgment from the station in response to the previous probe response from the access point within the specified threshold of time between the previous acknowledgement and the probe request is based on the entry.

12. The one or more tangible, non-transitory computer readable media of claim 7, wherein the processor is to create a wireless network connection between the station and the access point.

13. A method of operating an access point in a wireless communication network, comprising:
  receiving a probe request from a station;
  in response to the probe request, determining whether to respond to the probe request based on whether the access point received a previous acknowledgment from the station in response to a previous probe response from the access point within a specified threshold of time between the previous acknowledgement and the probe request; and
  transmitting a probe response to the station if the access point did not receive the previous acknowledgment from the station within the specified threshold of time; and
  do not transmit the probe response to the station if the access point did receive the previous acknowledgment from the station within the specified threshold of time.

14. The method of claim 13, wherein determining whether to respond includes determining that an acknowledgement log of the access point does not include an entry for the station.

15. The method of claim 13 comprising:
  generating an entry to an acknowledgment log of the access point in response to previous acknowledgement from the station responding to the previous probe request; and
  recording the entry in a computer memory of the one access point.

16. The method of claim 15, wherein the entry includes:
  an identifier (ID) of the station; and
  a time when the access point determines the station previously acknowledged the previous probe response from the access point.

17. The method of claim 16, wherein determining whether to respond is based on when the station previously acknowledged the previous probe response.

18. The method of claim 17, wherein determining whether the access point received a previous acknowledgment from the station in response to the previous probe response from the access point within the specified threshold of time between the previous acknowledgement and the probe request is based on the entry.

19. The method of claim 13, comprising creating a wireless network connection between the station and the access point.

* * * * *